(12) United States Patent
Kim et al.

(10) Patent No.: US 12,225,323 B2
(45) Date of Patent: Feb. 11, 2025

(54) EVENT-ORIENTED MULTI-CHANNEL VIDEO BACKUP APPARATUS AND METHOD, AND NETWORK SURVEILLANCE CAMERA SYSTEM INCLUDING THE SAME

(71) Applicant: HANWHA TECHWIN CO., LTD., Seongnam-si (KR)

(72) Inventors: Hyun Ho Kim, Seongnam-si (KR); Jaeyoung Shin, Seongnam-si (KR); Byoungki An, Seongnam-si (KR); Daehyun Gu, Seongnam-si (KR); Youngin Yun, Seongnam-si (KR); Ji-eun Kim, Seongnam-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 0 days.

(21) Appl. No.: 17/752,523

(22) Filed: May 24, 2022

(65) Prior Publication Data

US 2022/0286642 A1 Sep. 8, 2022

Related U.S. Application Data

(63) Continuation of application No. PCT/KR2020/014985, filed on Oct. 30, 2020.
(Continued)

(30) Foreign Application Priority Data

Feb. 10, 2020 (KR) .......... 10-2020-0015668

(51) Int. Cl.
*H04N 5/91* (2006.01)
*G06F 11/14* (2006.01)
(Continued)

(52) U.S. Cl.
CPC .......... *H04N 5/91* (2013.01); *G06F 11/1464* (2013.01); *G06F 16/71* (2019.01); *G06F 16/73* (2019.01);
(Continued)

(58) Field of Classification Search
USPC ......................................... 386/223–224, 230
See application file for complete search history.

(56) References Cited

U.S. PATENT DOCUMENTS

2006/0034586 A1* 2/2006 Millar .................. G11B 27/105
348/E7.086
2006/0078047 A1* 4/2006 Shu .................. G08B 13/19613
348/E7.086
(Continued)

FOREIGN PATENT DOCUMENTS

JP 2012123460 A * 6/2012 .......... G06V 10/772
KR 10-2008-0035892 A 4/2008
(Continued)

OTHER PUBLICATIONS

International Search Report (PCT/ISA/210) issued Jan. 29, 2021 by the International Searching Authority in counterpart International Application No. PCT/KR2020/014985.
(Continued)

*Primary Examiner* — Hung Q Dang
(74) *Attorney, Agent, or Firm* — Sughrue Mion, PLLC

(57) ABSTRACT

A network surveillance camera system includes a network surveillance camera system including: a video receiving and/or searching device connected to a plurality of cameras through a network, and configured to receive video information in real time from the plurality of cameras through multiple channels and perform a video search on the video information; and a video backup device configured to store event-oriented and channel-wise video backup information
(Continued)

generated according to a result of the video search of the video receiving and/or searching device, and play back the event-oriented and channel-wise video backup information, wherein the video information is obtained by the plurality of cameras configured to capture a plurality of surveillance areas, respectively, and wherein the event-oriented and channel-wise video backup information includes a video backup file generated for each channel and a video playback software player.

20 Claims, 10 Drawing Sheets

Related U.S. Application Data

(60) Provisional application No. 62/940,343, filed on Nov. 26, 2019.

(51) Int. Cl.
| | |
|---|---|
| *G06F 16/71* | (2019.01) |
| *G06F 16/73* | (2019.01) |
| *G06T 7/11* | (2017.01) |
| *G06V 20/40* | (2022.01) |
| *G06V 20/52* | (2022.01) |
| *H04N 5/77* | (2006.01) |
| *H04N 7/18* | (2006.01) |

(52) U.S. Cl.
CPC ............. *G06T 7/11* (2017.01); *G06V 20/40* (2022.01); *G06V 20/52* (2022.01); *H04N 5/77* (2013.01); *H04N 7/188* (2013.01); *G06F 2201/84* (2013.01); *G06T 2207/10016* (2013.01); *G06T 2207/20132* (2013.01); *G06T 2207/30232* (2013.01); *G06V 2201/10* (2022.01)

(56) References Cited

U.S. PATENT DOCUMENTS

| | | | |
|---|---|---|---|
| 2006/0170791 A1 | 8/2006 | Porter et al. | |
| 2006/0279628 A1* | 12/2006 | Fleming | H04N 5/76 348/E7.086 |
| 2008/0018737 A1* | 1/2008 | Suzuki | G08B 13/19608 348/143 |
| 2008/0080743 A1* | 4/2008 | Schneiderman | G08B 13/196 382/118 |
| 2009/0089845 A1* | 4/2009 | Akers | G06F 16/70 725/92 |
| 2011/0128382 A1* | 6/2011 | Pennington | G07F 17/3241 348/E7.085 |
| 2014/0333776 A1* | 11/2014 | Dedeoglu | H04N 21/44008 348/159 |
| 2015/0215583 A1* | 7/2015 | Chang | H04N 7/181 348/159 |
| 2018/0113577 A1* | 4/2018 | Burns | H04N 21/47217 |
| 2018/0184049 A1 | 6/2018 | Moss et al. | |
| 2018/0285633 A1* | 10/2018 | Alcock | G06V 40/20 |
| 2018/0295428 A1 | 10/2018 | Bi et al. | |
| 2019/0156665 A1* | 5/2019 | Watanabe | G06Q 50/26 |
| 2019/0180112 A1* | 6/2019 | Lee | G06V 20/41 |
| 2019/0333542 A1* | 10/2019 | Qin | H04N 5/77 |
| 2020/0234037 A1* | 7/2020 | Ogura | G06V 40/169 |

FOREIGN PATENT DOCUMENTS

| | | |
|---|---|---|
| KR | 10-2014-0098959 A | 8/2014 |
| KR | 10-2015-0084567 A | 7/2015 |

OTHER PUBLICATIONS

Written Opinion (PCT/ISA/237) issued Jan. 29, 2021 by the International Searching Authority in counterpart International Application No. PCT/KR2020/014985.

Examination Report issued on Oct. 5, 2023 issued by the European Patent Office for EP Patent Application No. 20892795.4.

Office Action issued Nov. 4, 2024 by the Korean Patent Office for KR Patent Application No. 10-2020-0015668.

* cited by examiner

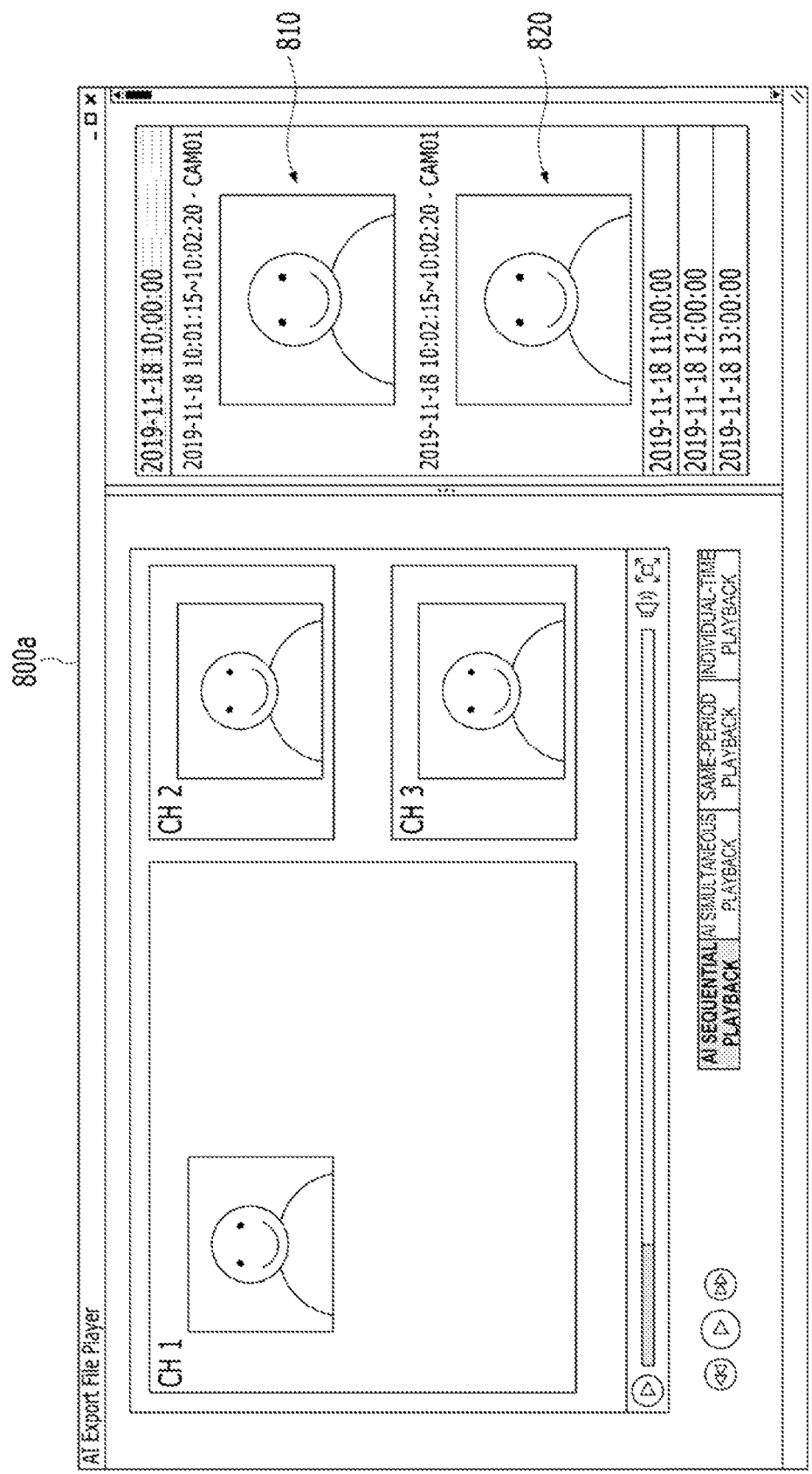

EVENT-ORIENTED MULTI-CHANNEL VIDEO BACKUP APPARATUS AND METHOD, AND NETWORK SURVEILLANCE CAMERA SYSTEM INCLUDING THE SAME

CROSS-REFERENCE TO THE RELATED APPLICATION(S)

This application is a bypass continuation application of International Application No. PCT/KR2020/014985, filed on Oct. 30, 2020, in the Korean Intellectual Property Receiving Office and claiming priorities to U.S. Provisional Application No. 62/940,343, filed Nov. 26, 2019, and Korean Patent Application No. 10-2020-0015668, filed Feb. 10, 2020, the disclosures of which are incorporated by reference herein in their entireties.

BACKGROUND

1. Field

Embodiments of the disclosure relate to a network surveillance camera system, and more particularly, to an event-oriented multi-channel video backup apparatus and method for a multi-channel video search result detected in a network surveillance camera system.

2. Description of the Related Art

Recent surveillance camera systems can transmit various video analysis information acquired in a surveillance area by using a network camera that performs intelligent video analysis, together with video and audio signals.

A network-based surveillance camera system may include a network surveillance camera and a video receiving apparatus such as a digital video recorder (DVR) or a network video recorder (NVR), which receives information acquired by the network surveillance camera through real-time streaming (RTS)/real-time streaming protocol (RTSP)-based media streaming. In this case, the information transmission scheme adopts a standard protocol through video surveillance standardization organizations such as the Open Network Video Interface Forum (ONVIF), and the RTSP is a standard communication protocol (RFC2326) developed by the Internet Engineering Task Force (IETF), which can be used to remotely control media servers. In order to transmit media streaming data including actual video and audio, a Real-time Transport Protocol (RTP) may be mainly used together as a transport layer.

In the related art network-based surveillance camera system, videos captured from surveillance areas of surveillance cameras may be transmitted to the video receiving apparatus, and the video receiving apparatus may store information on the received camera-wise video information for a specific period (e.g., 30 days). Then, information associated with a specific event or accident among the stored information can be converted into a movable form and stored, i.e., backed up, and the backed-up information may be used to confirm or identify the background, suspect, or the like of the event or accident.

However, in the related art method, when video information acquired from a plurality of surveillance areas is stored simply for a specific period, it is quite inconvenient to select only information associated with a specific event or accident from among the stored information.

As an example, in order to selectively back up corresponding video information according to the route of a specific object related to a specific event, there is a difficulty in searching for information stored for each camera, and there is a disadvantage in that the reliability of selected backup information may not be high.

SUMMARY

Example embodiments of the disclosure provide an event-oriented multi-channel video backup apparatus and method and a network surveillance camera system including the same. According to example embodiments, in a network surveillance camera system including a video receiving/searching device configured to receive video signals and/or video analysis information detected in surveillance areas of a plurality of network cameras and still images for specific analysis areas, the event-oriented multi-channel video backup apparatus may specify a predetermined object in multi-channel video information transmitted from the plurality of network cameras, search for the video information, and back up and play back the search result in an event-oriented manner, to provide convenience to a user.

According to an aspect of an example embodiment, there is provided a network surveillance camera system including: a video receiving and/or searching device connected to a plurality of cameras through a network, and configured to receive video information in real time from the plurality of cameras through multiple channels and perform a video search on the video information; and a video backup device configured to store event-oriented and channel-wise video backup information generated according to a result of the video search of the video receiving and/or searching device, and play back the event-oriented and channel-wise video backup information, wherein the video information is obtained by the plurality cameras configured to capture a plurality of surveillance areas, respectively, and wherein the event-oriented and channel-wise video backup information includes a video backup file generated for each channel and a video playback software player.

The video receiving and/or searching device may receive metadata and a still image from each camera of the plurality of cameras; the metadata may be generated by each camera based on video analysis information corresponding to the a surveillance area, of the plurality of surveillance areas; and the still image may be generated by each cameras by cropping a video portion corresponding to an object detected within the surveillance area among the video analysis information.

The metadata may include detection information, identification information, location information, and time information of the object captured in the surveillance area.

The still image may be an image selected, among video data captured in the surveillance area, as an image suitable for recognizing a specific object.

The still image may include a Joint Photographic Experts Group (JPEG) image file.

The video receiving and/or searching device may include a search viewer application program configured to generate a thumbnail image using channel-wise still images transmitted from the plurality of cameras and perform the video search on the video information received through the multiple channels.

The search viewer application program may display object identification information of channel-wise metadata transmitted from the plurality of cameras and displays thumbnail images corresponding to the object identification information.

Video information associated with a predetermined thumbnail image selected from among the thumbnail images may be generated as the event-oriented and channel-wise video backup information, and the generated video backup information is provided to the video backup device.

The video backup file generated for each channel may include one or more of a timeline database, a key frame index database, a video frame header and video data, an audio frame header and audio data, a metadata header and metadata, and a still image header and a still image file.

The video playback software player may be operated in a mode, among a plurality of modes, according to a user's selection, the plurality of modes including a sequential playback mode, a simultaneous playback mode, a same-period playback mode, and an individual-time playback mode.

According to an aspect of an example embodiment, there is provided an event-oriented multi-channel video backup method, including: capturing, by using a plurality of cameras, a plurality of surveillance areas to acquire video information for the plurality of surveillance areas; transmitting the video information for each of the plurality of surveillance areas through a corresponding one of multiple channels; receiving the video information from the plurality of cameras and performing a video search on the video information received through the multiple channels; backing up channel-wise video information generated according to a result of the video search; and storing and playing back the backed-up information, wherein the backing up the channel-wise video information includes backing up metadata included in the video information for each of the plurality of surveillance areas, and the playing back the backed-up information is performed in an event-oriented and channel-wise manner based on the backed-up metadata.

The video information may include video analysis information for the video information for each surveillance area generated as metadata and a still image obtained by cropping a video portion corresponding to an object detected within a surveillance area.

The performing the video search may include: generating a thumbnail image using channel-wise still images transmitted from the plurality of cameras; displaying object identification information of channel-wise metadata transmitted from the plurality of cameras in a form of text and displaying thumbnail images corresponding to the object identification information; and generating video information associated with predetermined thumbnail images selected from among the thumbnail images as video backup information.

The video backup information may include a video backup file generated for each channel and a video playback software player, and wherein the metadata included in the video information is extracted based on the channel-wise video information being backed up, and is contained in the video backup file for each channel.

The video backup file generated for each channel may include one or more of a timeline database, a key frame index database, a video frame header and video data, an audio frame header and audio data, a metadata header and metadata, and a still image header and a still image file.

The video playback software player may be operated in a mode, among a plurality of modes, according to a user's selection, the plurality of modes including a sequential playback mode, a simultaneous playback mode, a same-period playback mode, and an individual-time playback mode.

According to an aspect of an example embodiment, there is provided a video backup device including: an event-oriented channel-wise video backup file, generated according to a search result performed on channel-wise video information received from a surveillance camera; and a video playback software player configured to play back an event-based video selected by combining one or more pieces of information included in the event-oriented channel-wise video backup file, wherein the one or more pieces of information include a still image and metadata corresponding to the channel-wise video information.

The metadata may include one or more of detection information, identification information, location information, and time information of an object captured by the surveillance camera, and the still image is selected as a still image suitable for a specific object in video data captured by the surveillance camera.

The event-oriented channel-wise video backup file may include: basic information including one or more format version information, creator information, basic information of an original camera list, and start offset position information of recorded data in a file; and detailed information including one or more of a timeline database, a key frame index database, a video frame header and video data, an audio frame header and audio data, a metadata header and metadata, and a still image header and a still image file.

The video playback software player may be operated in a mode, among a plurality of modes, according to a user's selection, the plurality of modes including a sequential playback mode, a simultaneous playback mode, a same-period playback mode, and an individual-time playback mode.

BRIEF DESCRIPTION OF THE DRAWINGS

The above and other features and advantages will become more apparent by describing in detail exemplary embodiments thereof, with reference to the attached drawings.

FIGS. 8A to 8D are diagrams showing examples of a video playback mode executed by a video playback software player included in video backup information according to an embodiment of the disclosure.

DETAILED DESCRIPTION

Figure 1:
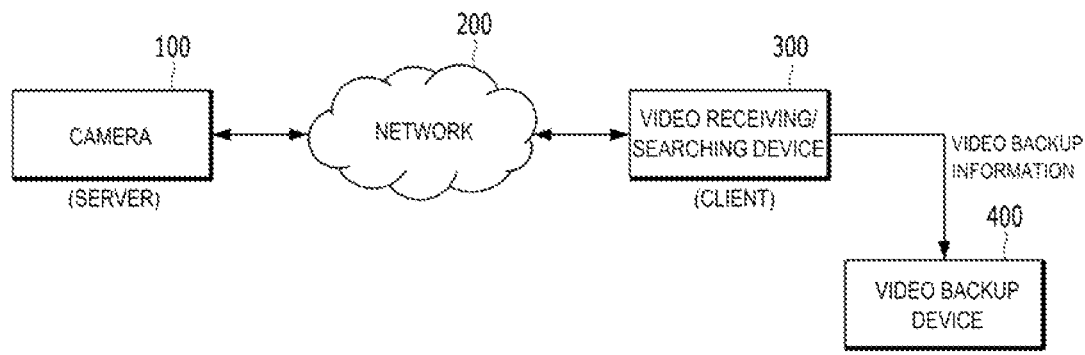
FIG. 1 is a block diagram schematically showing a configuration of a network surveillance camera system according to an embodiment of the disclosure.

In the following description, for the purposes of explanation, numerous specific details are set forth in order to provide a thorough understanding of various example embodiments or implementations of the disclosure. As used herein "embodiments" and "implementations" are interchangeable words that are non-limiting examples of devices or methods employing one or more of the inventive concepts disclosed herein. It is apparent, however, that various example embodiments may be practiced without these specific details or with one or more equivalent arrangements. In other instances, well-known structures and devices are shown in block diagram form in order to avoid unnecessarily obscuring various example embodiments. Further, various example embodiments may be different, but do not have to be exclusive. For example, specific shapes, configurations, and characteristics of an example embodiment may be used or implemented in another example embodiment without departing from the inventive concepts.

Each block in the accompanying block diagram may also be performed by computer program instructions (execution engines), and these computer program instructions may be mounted on a processor of a general-purpose computer, a special-purpose computer, or another programmable data processing equipment. Thus, the instructions executed through the processor of the computer or the another programmable data processing equipment may provide means for performing functions described in each block of the block diagram.

These computer program instructions may also be stored in a computer-usable or computer-readable memory that may be directed to the computer or the another programmable data processing equipment in order to implement functions in a specific way. Therefore, the instructions stored in the computer-usable or computer-readable memory may also produce a manufacturing article including instruction means for performing the functions described in each block of the block diagram.

Furthermore, the computer program instructions may be mounted on the computer or the another programmable data processing equipment. Therefore, the instructions, which generate a process, in which a series of operation steps are performed on the computer or the another programmable data processing equipment and executed by the computer, and execute the computer or the another programmable data processing equipment, may also provide functions for performing the functions described in each block of the block diagram.

Furthermore, each block may represent a part of a module, a segment, or a code including one or more executable instructions for performing specific logical functions, and functions mentioned in blocks or steps may also occur out of order in some alternative embodiments.

That is, two blocks illustrated may also be executed at substantially the same time, and may also be executed in the reverse order of a corresponding function as necessary.

The terms used herein are for the purpose of not limiting but describing specific embodiments. Throughout the specification, when a certain part is referred to as "including" a certain component, it indicates that the part may not exclude but further include other components, unless otherwise stated. Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, example embodiments of the inventive concepts will be described in more detail with reference to the accompanying drawings.

FIG. 1 is a block diagram schematically showing a configuration of a network surveillance camera system according to an embodiment of the disclosure.

Referring to FIG. 1, the network surveillance camera system according to an embodiment of the disclosure may include a camera 100, a network 200, a video receiving and/or searching device (hereinafter, referred to as a video receiving/searching device) 300, and a video backup device 400. In the network surveillance camera system, video information acquired by the camera 100 may be transmitted to the video receiving/searching device 300 over the network 200, and an administrator may search for the transmitted multi-channel video information using the video receiving/searching device 300. That is, in an embodiment of the disclosure, the camera 100 may serve as a server that transmits data, and the video receiving/searching device 300 may serve as a client that receives the transmitted data.

Also, the video backup device 400 may perform an operation of storing and playing back event-oriented channel-wise video backup information generated according to the video search result of the video receiving/searching device 300. In this case, the video backup information may include a video backup file generated for each channel and a video playback software player.

The camera 100, which captures a surveillance area to acquire video and audio signals for the surveillance area, may capture the surveillance area in real time for the purpose of surveillance or security. In an embodiment of the disclosure, the camera 100 may be implemented in a plurality, and the plurality of cameras 100 may capture a plurality of surveillance areas, acquire video information for each surveillance area, and transmit the video information acquired for each surveillance area over a corresponding channel. In other words, according to an embodiment of the disclosure, the camera 100 may be implemented in a plurality to perform an operation of acquiring video information of a video signal for each surveillance area. That is, each of the plurality of cameras 100 may perform an operation of generating and transmitting a multi-channel video signal corresponding to the surveillance area.

The camera 100 may be implemented as a pan-tilt-zoom (PTZ) camera capable of panning and tilting and capable of adjusting lens zoom magnification, and the camera 100 may be implemented as a network camera for performing an intelligent video analysis function.

As an example, the camera 100 according to an embodiment of the disclosure may generate and transmit video information including video signals corresponding to the surveillance area and also video analysis information for the video information in the form of metadata. The metadata may be created in a text format and may be implemented in various forms interpretable by a system. As an example, the metadata may be implemented in a text format with rules such as EXtensible Markup Language (XML) and JavaScript Object Notation (JSON) or in a binary form defined by its own protocol.

The metadata may include one or more of object detection information (e.g., movement, sound, intrusion into a designated area, etc.) captured in the surveillance area, object identification information (e.g., person, car, face, hat, clothing, etc.), and unique identifier information of an object for object tracking, location information (e.g., coordinates, size, etc.) of a detected object, and time information. The metadata may be transmitted to the video receiving/searching device 300 through the network 200 in real time together with the video and audio signals detected in the surveillance area and then may be used for real-time control and video search to improve control convenience and search efficiency.

In the following embodiment, the camera 100 will be described as, for example, a network camera that performs an intelligent video analysis function and generates the video analysis signal, but the operation of the network surveillance camera system according to an embodiment of the disclosure is not necessarily limited thereto. As an example, the camera 100 may transmit video information corresponding to each surveillance area, and when the video information is received, the video receiving/searching device 300 may analyze the video information and generate video analysis information for the video information.

The camera 200 according to an embodiment of the disclosure may capture a still image for a specific analysis area among the video analysis information while generating the metadata, and may transmit the still image in real time. As an example, the still image may be implemented as a JPEG image file.

The camera 100 may transmit information to the video receiving/searching device 300 using various wired/wireless communication schemes such as Ethernet, Wi-Fi, and Bluetooth and may receive instructions from the video receiving/searching device 300.

The network 200 may encompass wired networks such as local area networks (LANs), wide area networks (WANs), metropolitan area networks (MANs), and Integrated Service Digital Network (ISDN) and wireless networks such as wireless LANs, code division multiple access (CDMA), Bluetooth, satellite communication, etc., but the scope of the disclosure is not limited thereto.

The video receiving/searching device 300 may receive and store data transmitted from the camera 200 and may perform an operation of analyzing and monitoring the data.

In the following embodiment, the video receiving/searching device 300 is illustrated as one block, but the configuration and operation of the video receiving/searching device 300 according to the embodiment of the disclosure are not limited thereto.

More specifically, the video receiving/searching device 300 may implement a function of a video receiving device for receiving and storing data transmitted from the camera 200 and a function of a video searching device for performing an operation of analyzing and monitoring the data. In this case, the video receiving device and the video searching device may be physically separated from each other or may be implemented together through one server system.

As an example, the video receiving device may be implemented as a digital video recorder (DVR), a network video recorder (NVR), a video management system (VMS), etc., and the video searching device may be implemented as a separate device or application software that performs a function of searching for and analyzing camera video data stored in the video receiving device. Thus, an administrator may search for the transmitted multi-channel video information using the video receiving/searching device 300.

The video backup device 400 may perform an operation of storing and playing back event-oriented channel-wise video backup information generated according to the video search result of the video receiving/searching device 300. In this case, the video backup information may include a video backup file generated for each channel and a video playback software player.

As an example, the video backup device 400 may be implemented as an external storage medium such as Universal Serial Bus (USB) and may play back the video backup file stored in the video backup device 400 through an external terminal connected to the video backup device 400, e.g., a user's laptop, cell phone, etc.

Figure 2:
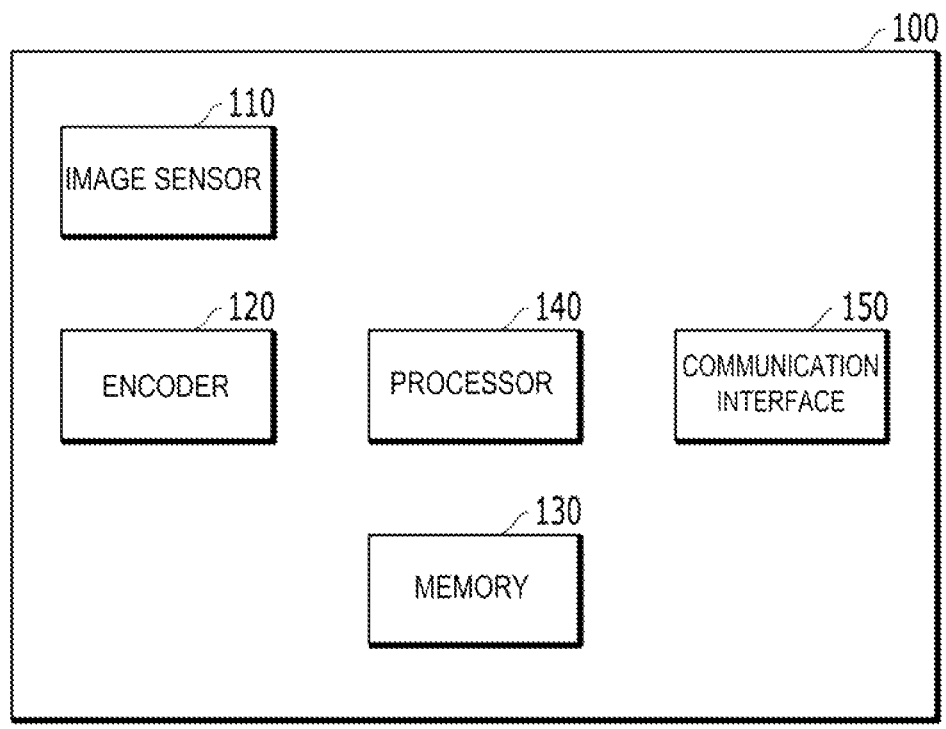
FIG. 2 is a block diagram showing a configuration of a camera shown in FIG. 1.
Figure 3:
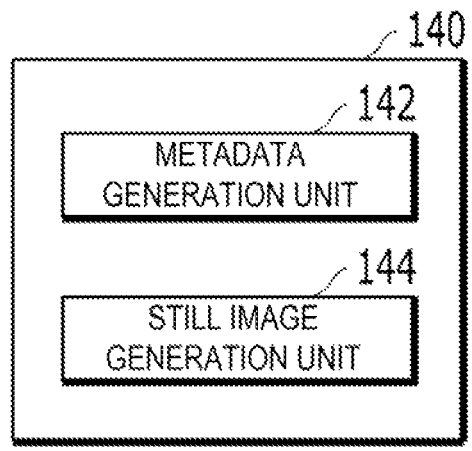
FIG. 3 is a block diagram showing an example of an internal configuration of a processor shown in FIG. 2.

FIG. 2 is a block diagram showing a configuration of the camera shown in FIG. 1, and FIG. 3 is a block diagram showing an example of an internal configuration of a processor shown in FIG. 2. As described above, the camera 100 shown in FIGS. 2 and 3 will be described as, for example, a network camera that performs an intelligent video analysis function and generates the video analysis signal, but the operation of the network surveillance camera system according to an embodiment of the disclosure is not necessarily limited thereto.

First, referring to FIG. 2, the camera 100 may include an image sensor 110, an encoder 120, a memory 130, a processor 140, and a communication interface 150.

The image sensor 110, which performs a function of capturing a surveillance area to acquire a video, may be implemented as, for example, a charge-coupled device (CCD) sensor, a complementary metal-oxide-semiconductor (CMOS) sensor, etc.

The encoder 120 may perform an operation of encoding a video acquired through the image sensor 110 into a digital signal, and may follow, for example, H.264, H.265, Moving Picture Experts Group (MPEG), and Motion Joint Photographic Experts Group (M-JPEG) standards.

The memory 130 may store video data, voice data, a still image, metadata, etc. As described above, the metadata may be data including any one or more of object detection information (e.g., movement, sound, intrusion into a designated area, etc.) captured in the surveillance area, object identification information (e.g., person, car, face, hat, clothing, etc.), and detected location information (e.g., coordinates, size, etc.).

Also, the still image, which is generated together with the metadata and stored in the memory 130, may be generated by capturing image information for a specific analysis area among the video analysis information. As an example, the still image may be implemented as a JPEG image file.

As an example, the still image may be generated by cropping a specific area of video data determined to include an identifiable object among video data of the surveillance area detected in a specific area of a surveillance area for a specific period and may be transmitted in real time together with the metadata.

The communication interface 150 transmits the video data, the sound data, the still image, and/or the metadata to the video receiving/searching device 300. The communication interface 150 according to an embodiment may transmit the video data, the sound data, the still image, and/or the metadata to the video receiving/searching device 300 in real time. The communication interface 150 may perform a communication function of at least one of a local area network (LAN), Wi-Fi, ZigBee, Bluetooth, and near field communication.

The processor 140, which controls the overall operation of the camera 100, may be configured to process computer program instructions by performing basic arithmetic, logic, and input/output operations. The instructions may be provided to the processor 140 by the memory 130 or the communication interface 150. As an example, the processor 140 may be configured to execute an instruction received according to program code stored in a recording device such as the memory 130. The processor 140 may include a program module that is implemented by software such as C, C++, Java, Visual Basic, and Visual C to perform various functions.

Referring to FIG. 3, the processor 140 of the network camera 200 according to an embodiment of the disclosure may include a metadata generation unit 142 and a still image generation unit 144.

Here, the processor 140 may be implemented to execute an instruction according to at least one of program code and operating system code included in the memory 130. In this case, the components of the processor 140, that is, the metadata generation unit 142 and the still image generation unit 144, may be understood as separately representing different functions performed by the processor 140 according to a control instruction provided by the program code stored in the camera 200.

The metadata generation unit 142 may perform a function of generating video analysis information corresponding to the surveillance area of each camera in the form of metadata. The metadata may include one or more of object detection information (e.g., movement, sound, intrusion into a designated area, etc.) captured in the surveillance area, object identification information (e.g., person, car, face, hat, clothing, etc.), and unique identifier information of an object for object tracking, location information (e.g., coordinates, size, etc.) of a detected object, and time information, and the metadata may be transmitted to the video receiving/searching device 300 through the network 200 in real time together with the video and audio signals detected in the surveillance area and then may be used for real-time control and video search to improve control convenience and search efficiency.

The processor 140 of the camera 200 according to an embodiment of the disclosure captures and generates a still image for a specific analysis area among the video analysis information through the still image generation unit 144 while generating the metadata, and the still image generated through the still image generation unit 144 may be stored in the memory 130.

As an example, the still image may be generated by cropping a specific area of video data determined to include an identifiable object among video data of the surveillance area detected in a specific area for a specific period.

More specifically, the still image may be a still image generated by cropping a specific area of video data among the video analysis information corresponding to the surveillance area created in the metadata, i.e., a video portion corresponding to the identifiable object detected in the surveillance area.

For example, the still image may be selected by the processor 140 (e.g., the still image generation unit 144) as a "best shot" still image most suitable for recognizing a specific object among the video data captured in the surveillance area and then may be transmitted to the video receiving/searching device 300 in real time together with the metadata. Thus, a client such as the video receiving/searching device 300 may utilize the still image as a thumbnail image when searching for the transmitted video data without performing decoding as an example of separate video processing.

Figure 4:
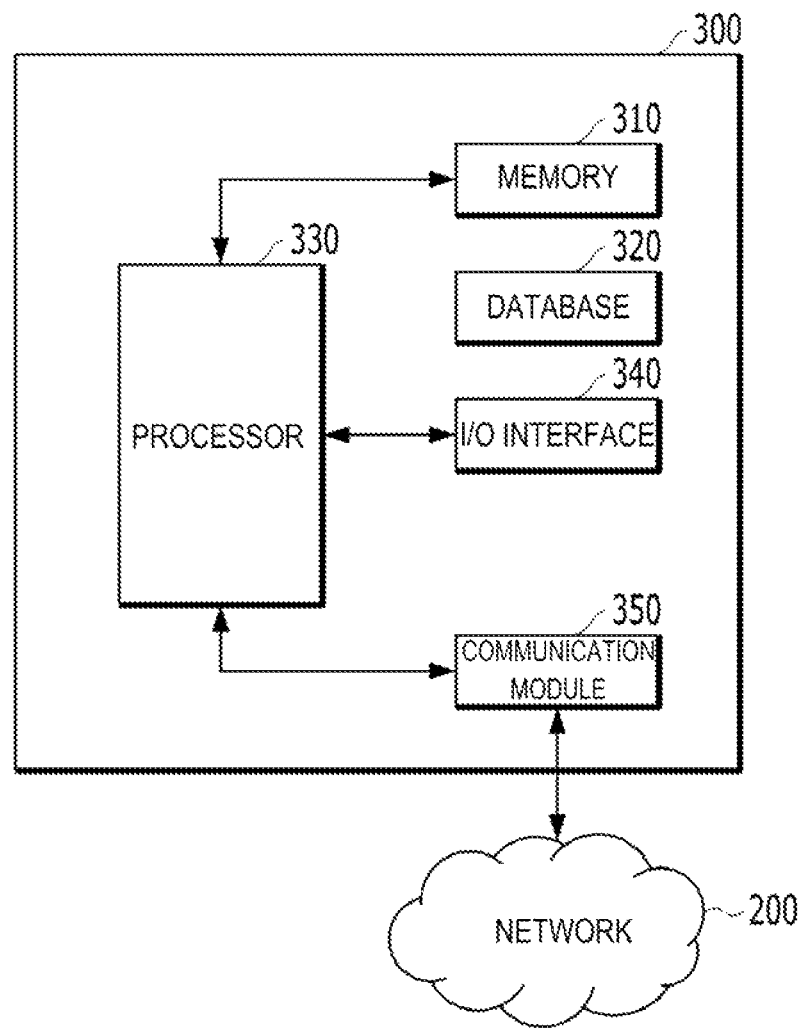
FIG. 4 is a block diagram showing a configuration of a video receiving/searching device shown in FIG. 1.
Figure 5:
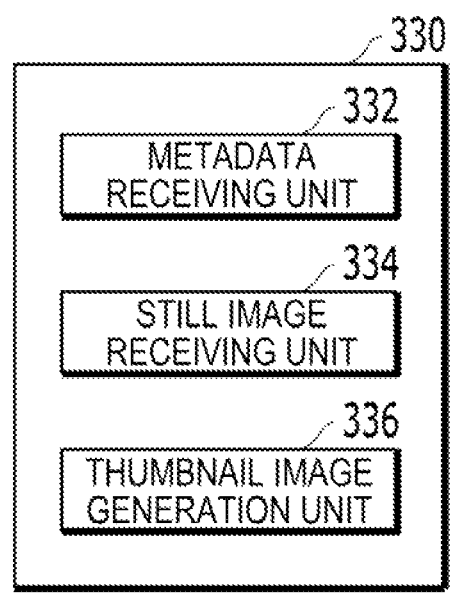
FIG. 5 is a block diagram showing an example of an internal configuration of a processor shown in FIG. 4.

FIG. 4 is a block diagram showing a configuration of the video receiving/searching device shown in FIG. 1, and FIG. 5 is a block diagram showing an example of an internal configuration of a processor shown in FIG. 4. Also, FIG. 6 is a diagram showing an example of searching for multi-channel video information through the video receiving/searching device according to an embodiment of the disclosure.

The video receiving/searching device 300 may receive and store data transmitted from the camera 200 and may serve as a client for analyzing and monitoring the data. As an example, the video receiving/searching device 300 implements a video receiving function for receiving multi-channel video information from the cameras 200 and a video search function for analyzing and searching for the received multi-channel video information. In particular, the video search function may be operated by installing an application program capable of implementing the function in a server system forming the video receiving device. However, as described above, in another example embodiment, the video receiving/searching device 300 may be implemented with a video receiving device and a video searching device as separate components.

Figure 6:
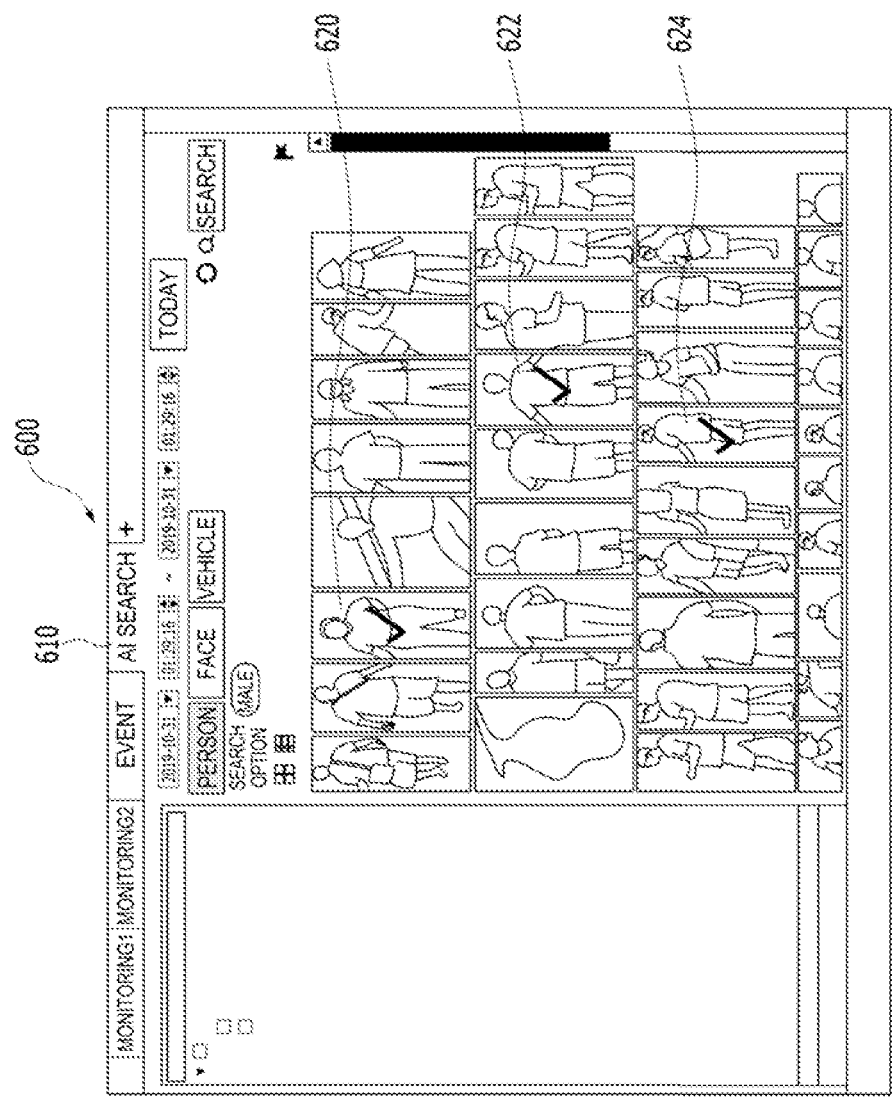
FIG. 6 is a diagram showing an example of searching for multi-channel video information through a video receiving/searching device according to an embodiment of the disclosure.

A search viewer as shown in FIG. 6 may be provided through an application program for performing the video search function, and thus an administrator may search for the transmitted multi-channel video information using the video receiving/searching device 300.

First, referring to FIG. 4, the video receiving/searching device 300 according to an embodiment of the disclosure may include a memory 310, a database 320, a processor 330, a communication module 350, and an input/output (I/O) interface 340.

The memory 310, which is a computer-readable recording medium, may include a non-volatile mass storage device such as a random-access memory (RAM), a read-only memory (ROM), or a disk drive. The memory 310 may store signals transmitted from the camera 100 shown in FIG. 1, for example, video data, sound data, a still image, and metadata corresponding to the surveillance area of the camera.

The database 320 may store and retain unique information (e.g., a camera ID, etc.) of the camera 100 shown in FIG. 1. That is, when surveillance cameras connected to the video receiving/searching device 300 are added and/or changed, the database 320 may also be updated with corresponding information.

The processor 330 may be configured to process computer program instructions by performing basic arithmetic, logic, and input/output operations. The instructions may be provided to the processor 330 by the memory 310 or the communication module 350. As an example, the processor 330 may be configured to execute an instruction received according to program code stored in a recording device such as the memory 310. The processor 330 may include a program module that is implemented by software such as C, C++, Java, Visual Basic, or Visual C to perform various functions.

The communication module 350 may provide a function of enabling communication with the camera 100 through the network 200. As an example, a control signal, an instruction, and the like which are provided under the control of the processor 330 of the video receiving/searching device 300 may be transmitted to the camera 100 via the network 200 through the communication module 350. Likewise, captured video information and/or location information generated through the camera 100 may be transmitted to the video receiving/searching device 300 via the network 200.

The I/O interface 340 may serve to provide an interface between an output device such as a display and an input device implemented as a keyboard or a mouse.

Referring to FIG. 5, the processor 330 of the video receiving/searching device 300 according to an embodiment of the disclosure may include a metadata receiving unit 332, a still image receiving unit 334, and a thumbnail image generation unit 336.

Here, the processor 330 may be implemented to execute an instruction according to at least one of program code and operating system code included in the memory 310. In this case, the components of the processor 330, that is, the metadata receiving unit 332, the still image receiving unit 334, and the thumbnail image generation unit 336, may be understood as separately representing different functions performed by the processor 330 according to a control instruction provided by the program code stored in the video receiving/searching device 300.

The metadata receiving unit 332 may be a functional block corresponding to the metadata generation unit 142, which is a functional block in the processor 140 of the camera 200 described above with reference to FIG. 3, and may perform a function of receiving metadata generated and transmitted by the metadata generation unit 142.

The metadata may include one or more of object detection information (e.g., movement, sound, intrusion into a designated area, etc.) captured in the surveillance area, object identification information (e.g., person, car, face, hat, clothing, etc.), and unique identifier information of an object for object tracking, location information (e.g., coordinates, size, etc.) of a detected object, and time information, and the metadata may be transmitted to the video receiving/searching device 300 through the network 200 in real time together with the video and audio signals detected in the surveillance area and then may be used for real-time control and video search to improve control convenience and search efficiency. An example of utilizing the metadata for a video search will be described in detail below with reference to FIG. 6.

The still image receiving unit 334 may be a functional block corresponding to the still image generation unit 144, which is a functional block in the processor 140 of the camera 200 described above with reference to FIG. 3, and may perform a function of receiving a still image generated and transmitted by the still image generation unit 144. As an example, the still image may be generated by cropping a specific area of video data determined to include an identifiable object among video data of the surveillance area detected in a specific area for a specific period. More specifically, the still image may be a still image generated by cropping a specific area among the video analysis information corresponding to the surveillance area created in the text-based metadata, i.e., a video portion corresponding to the identifiable object detected in the surveillance area. That is, the still image may be selected as a "best shot" still image most suitable for recognizing a specific object among the video data captured in the surveillance area.

The thumbnail image generation unit 336 performs a function of generating a thumbnail image using the still image received through the still image receiving unit 334 when searching for video data corresponding to the surveillance area transmitted from the camera 200.

That is, by generating the still image as a thumbnail image and displaying the thumbnail image, the video receiving/searching device 300 may utilize the corresponding image to play back the transmitted video data of the surveillance area. More specifically, a client may display a "best shot" still image corresponding to the metadata information as a thumbnail image in addition to displaying the video analysis information transmitted in the form of the metadata received through the metadata receiving unit 332 with respect to the surveillance area.

Thus, the video receiving/searching device 300 may efficiently use the resources of the client by utilizing the still image as the thumbnail image without performing a separate video decoding procedure, and as a result, it is possible to more quickly and accurately search for video data of a surveillance area. An example of utilizing the best shot still image for a video search will be described in detail below with reference to FIG. 6.

FIG. 6 is a diagram showing an example of searching for multi-channel video information through a video receiving/searching device according to an embodiment of the disclosure. FIG. 6 shows an example of a function provided by an application program that implements the video search function of the video receiving/searching device for analyzing and searching for received multi-channel video information.

Specifically, FIG. 6 shows a screen of a search viewer application program for searching for multi-channel video information received from the cameras 200. A user may select an "AI search (610)" mode, which is an intelligent video search mode, from among the modes of the search viewer. When the user selects the "AI search (610)" mode, a desired identification object may be selected from among objects such as "person," "face," and "vehicle" as object identification information of channel-wise metadata provided in the "AI search 610" mode. That is, the search viewer according to an embodiment of the disclosure may provide object identification information of the channel-wise metadata transmitted from the cameras. In the embodiment shown in FIG. 6, a screen corresponding to a case in which "person" is selected from the object identification information is displayed.

Referring to FIG. 6, "best shot" still images corresponding to metadata corresponding to an object "person" among video information acquired for each channel from a plurality of cameras may be displayed as thumbnail images, and a user may specify and select an object corresponding to an event or accident from among the "best shot" still images displayed as the thumbnail images. In the embodiment shown in FIG. 6, three "best shot" still images 620, 622, and 624 are selected by a user. In an embodiment of the disclosure, video information associated with the three selected "best shot" still images 620, 622, and 624 is generated as video backup information, and the video backup information is provided to the video backup device 400.

The video backup device 400 may perform an operation of storing and playing back the generated event-oriented channel-wise video backup information in response to the video search result of the video receiving/searching device 300.

As an example, the three "best shot" still images 620, 622, and 624 may correspond to video signals acquired from different cameras or may correspond to video signals acquired for different periods of time. Therefore, according to an embodiment of the disclosure, video information to be backed up is not simply backed up around a specific period, but by specifying an object related to an event and securing video information of a plurality of cameras that have captured the object, it is possible to play back corresponding video information along the route of the object. That is, by performing an intelligent video search through the network surveillance camera system by backing up and playing back the search result in an event-oriented manner according to an embodiment of the disclosure, it is possible to provide convenience to a user and improve accuracy and efficiency in tracking the object.

The video backup information may include a video backup file generated for each channel and a video playback software player.

Figure 7:
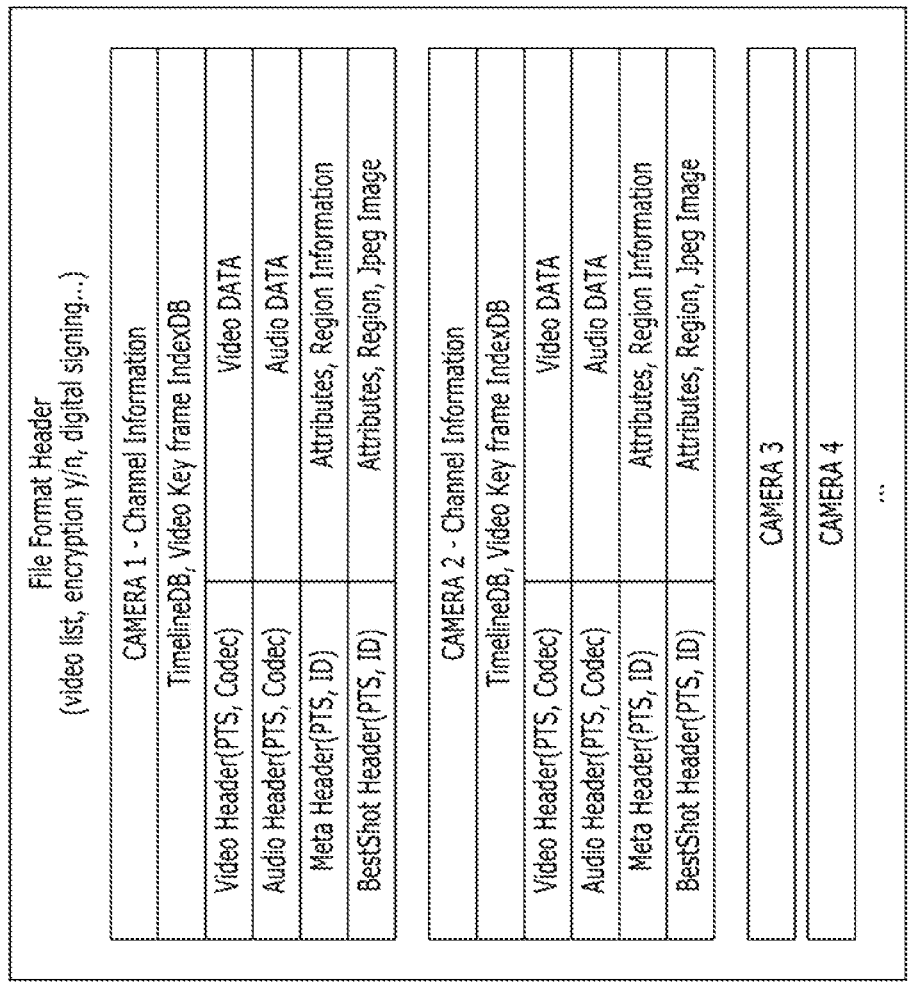
FIG. 7 is a diagram showing an example of a header of a channel-wise video backup file included in video backup information according to an embodiment of the disclosure.

FIG. 7 is a diagram showing an example of a header of a channel-wise video backup file included in video backup information according to an embodiment of the disclosure.

Referring to FIG. 7, the video backup file, which is video information associated with a "best shot" still image selected by a user as described above with reference to FIG. 6, may include all of a camera's recording timeline, metadata, a still image, a video signal, and an audio signal. That is, the video backup file may include the timeline, video, audio, metadata, and still images of a final video channel chosen as the search result.

More specifically, the channel-wise video backup file may include basic information and detailed information.

The basic information of the video backup file may include information such as, for example, format version information, creator information, basic information of an original camera list, and start offset position information of each piece of recorded data in a file.

The creator information is unique identification information such as a file creation date, a creator, a camera location, and a MAC address, and the basic information of the original camera list includes original source information such as a video channel model, a channel name, and a recording section.

The basic information may further include digital signature information, and when digital signature is performed, the basic information may include certificate data.

The basic information may further include encryption information, and when encryption is performed, the basic information may include all data encryption processing information and decryption information through a user input password.

The detailed information of the video backup file may include, for example, a timeline database (Timeline DB), a key frame index database (Key frame Index DB), a video frame header (Video Header) and video data (Video DATA), an audio frame header (Audio Header) and audio data (Audio DATA), a metadata header (Meta Header) and metadata (Attributes, Region Information, etc.), and a best shot still image header (BestShot Header) and a best shot still image file (Jpeg Image).

In this case, the video frame header may include codec information, a frame type, resolution, pts (Presentation Time Stamp), dts (Decoding Time Stamp), and a data size, and the audio frame header may include codec information, a channel, a sample rate, pts, a bit rate, and a data size.

The format of the backup file according to an embodiment of the disclosure is not limited to the file format shown in FIG. 7. For example, in another embodiment, an existing media container format and a separate metadata format may be utilized.

In this case, the existing media container format may be largely classified into a video coding format, an audio coding format, and a subtitle/capture format. As an example, MP4 (MPEG-4), MKV (Matroska Video Container), and AVI (Audio Video Interlaced) are widely used as standard video file formats.

FIGS. 8A to 8D are diagrams showing examples of a video playback mode executed by a video playback software player included in video backup information according to an embodiment of the disclosure.

The video playback software player included in the video backup information according to an embodiment of the disclosure, which is video playback software for effectively playing back a video backup file that has been shown in FIG. 7, may combine metadata, video data, and time information stored in the video backup file so that a user may play back a selected event-oriented video.

Figure 8B:
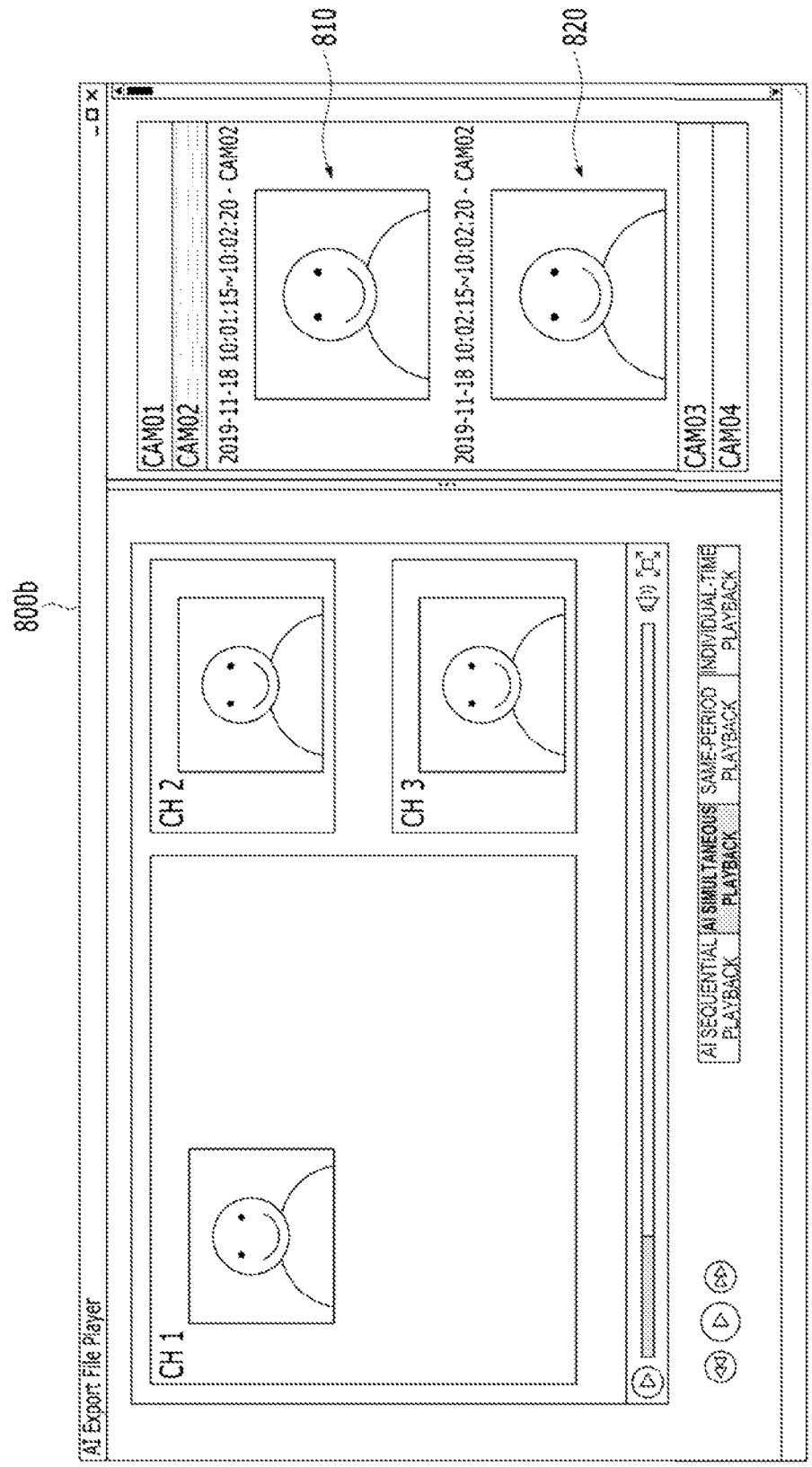

First, as shown in FIG. 8A, the video playback software player 800a may operate in a sequential playback mode. This operation may include an operation of sorting and sequentially playing back "best shot" still images 810 and 820 in a chronological order as thumbnail images previously selected as described in FIG. 6. In this case, when there are a plurality of camera recording sections (e.g., recording sections by a plurality of cameras) at the same time, the video playback software player 800a may be automatically switched to a multi-channel mode to play back multiple channel videos at the same time (see FIG. 8B).

As shown in FIG. 8B, a video playback software player 800b may operate in a simultaneous playback mode. This operation may be an operation of simultaneously playing back sections in which an object is detected in the "best shot" still images 810 and 820 as the thumbnail images previously selected as described in FIG. 6.

Figure 8C:
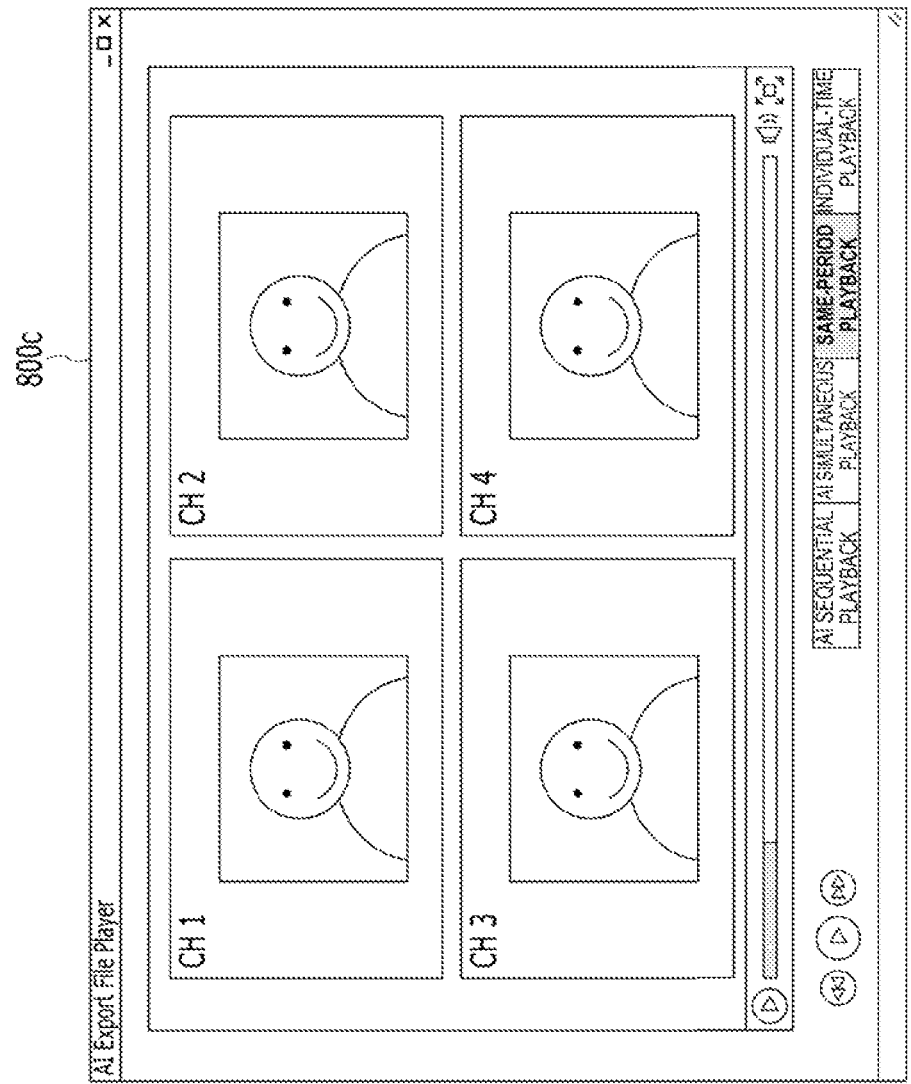

Also, as shown in FIG. 8C, a video playback software player 800c may operate in a same-period playback mode. This means that "best shot" still images selected as thumbnail images are played back in a chronological order from the earliest time on a timeline. However, when there are recording sections of a plurality of channels in the same period, the video playback software player 800c may be switched to the simultaneous playback mode.

Figure 8D:
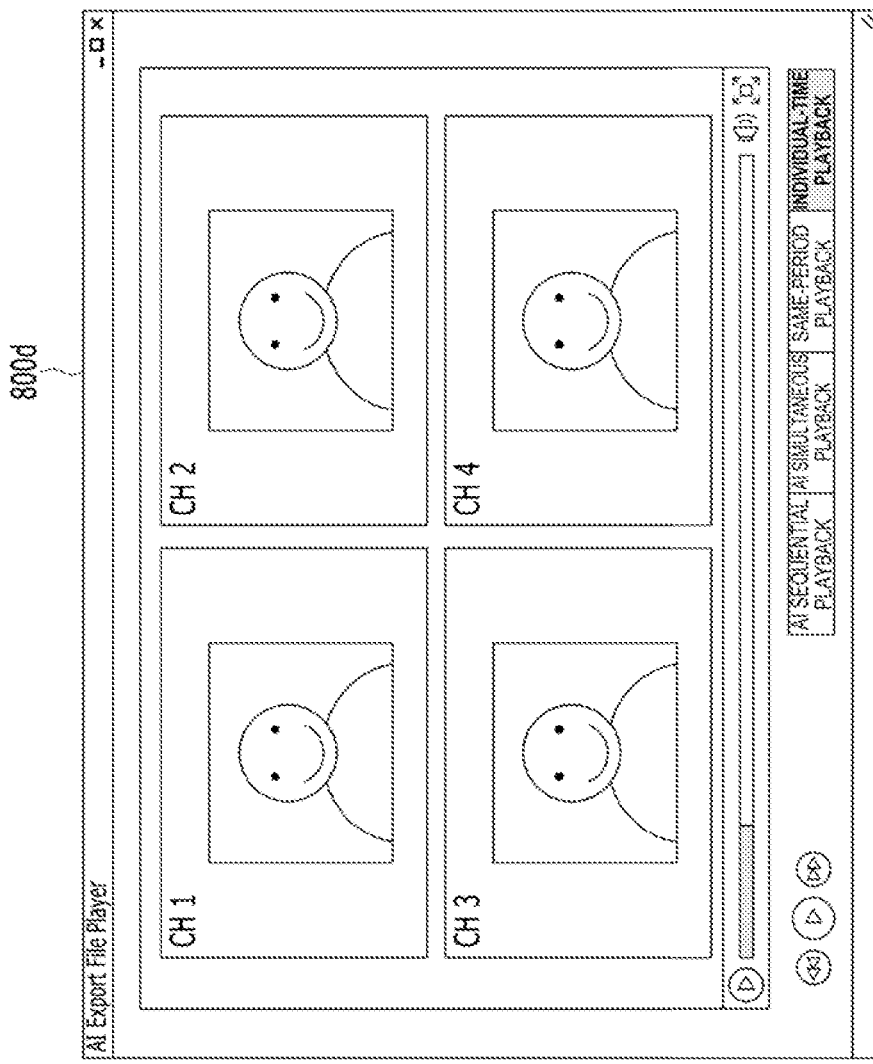

Further, as shown in FIG. 8D, a video playback software player 800d may operate in an individual-time playback mode. This means that channel-wise camera videos are simultaneously played back for the "best shot" still images as the selected thumbnail images. A user may control the timelines of individual cameras and may display object detection information on timeline sections.

While examples of a video playback mode are described with reference to FIGS. 8A-8D, it should be understood by a person of ordinary skill in the art that the video playback mode may not include all of the video playback modes in FIGS. 8A-8D and may include any other video playback mode(s).

Figure 9:
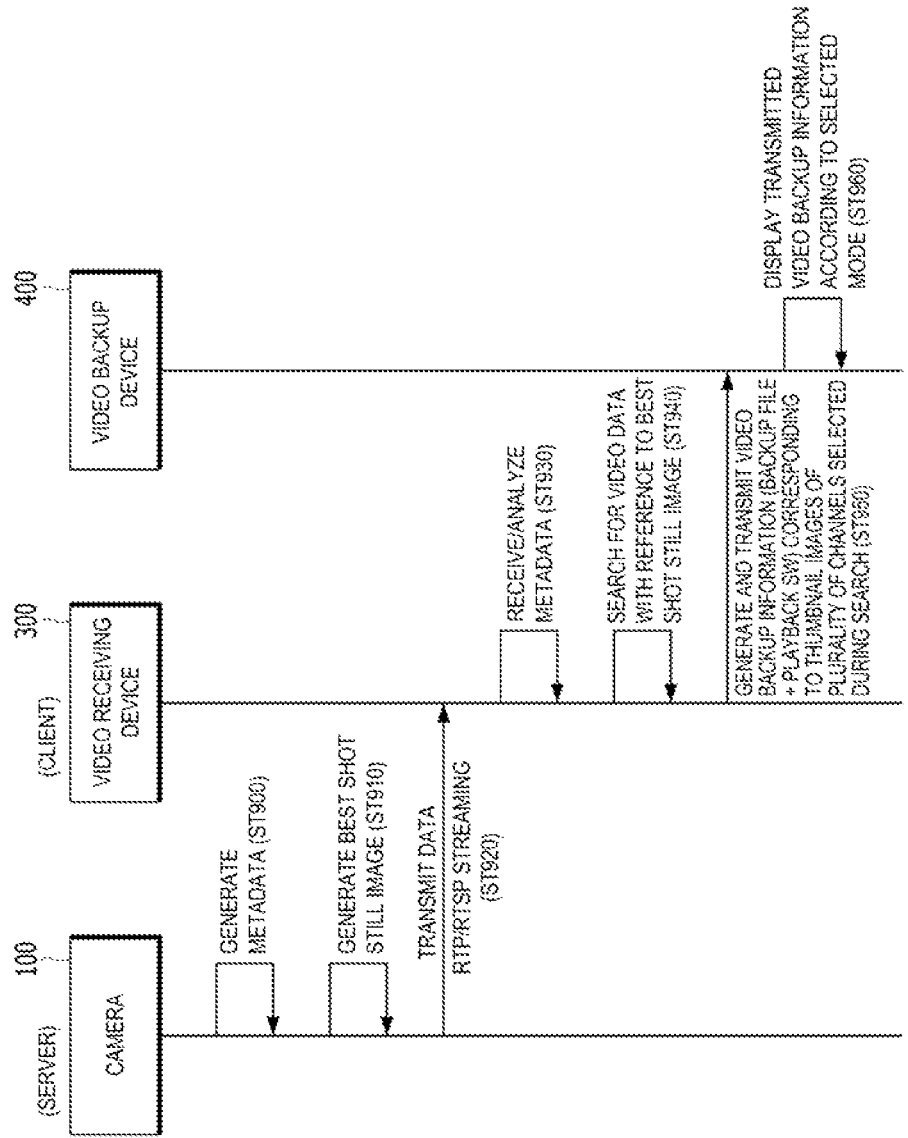
FIG. 9 is a diagram illustrating a method of operating a network surveillance camera system according to an embodiment of the disclosure.

FIG. 9 is a diagram illustrating a method of operating a network surveillance camera system according to an embodiment of the disclosure.

A method of operating a network surveillance camera system according to an embodiment of the disclosure will be described with reference to FIGS. 1 to 9.

A network surveillance camera system according to an embodiment of the disclosure includes the camera 100 configured to capture a surveillance area to acquire video and audio signals for the surveillance area and the video receiving device (a video receiving/searching device) 300 configured to receive data transmitted from the camera 100 and store and monitor the data. More specifically, as described above in detail, the video receiving/searching device 300 may provide an application program for searching for the multi-channel video information received from the cameras 200, and thus an administrator may search for the transmitted multi-channel video information using the video receiving/searching device 300. That is, in an embodiment of the disclosure, the camera 100 may serve as a server that transmits data, and the video receiving/searching device 300 may serve as a client that receives the transmitted data.

The video backup device 400 may perform an operation of storing and playing back event-oriented channel-wise video backup information generated according to the video search result of the video receiving/searching device 300. In this case, the video backup information may include a video backup file generated for each channel and a video playback software player.

As an example, the video backup device 400 may be implemented as an external terminal such as a USB and may play back the video backup file stored in the video backup device 400 through an external terminal connected to the video backup device 400, e.g., a user's laptop, cell phone, etc.

The camera 100 may be implemented as a network camera that performs an intelligent video analysis function. Accordingly, the camera 100 according to an embodiment of the disclosure may generate video analysis information corresponding to the surveillance area in the form of text-based metadata (ST900).

In an embodiment of the disclosure, the video analysis function of the camera 100 may be set through a protocol such as an http interface provided by the camera 100, and in this case, the setting values may be for a surveillance area for video analysis, a type to be identified, and the like. As an example, coordinate information for the surveillance area, an object type to be subjected to video analysis (e.g., car, person, bag, etc.), and an object type analyzed as metadata may be set or confirmed.

The metadata may include one or more of object detection information (e.g., movement, sound, intrusion into a designated area, etc.) captured in the surveillance area, object identification information (e.g., person, car, face, hat, clothing, etc.), and detected location information (e.g., coordinates, size, etc.).

While generating the metadata, the camera 100 may capture and generate a still image for a specific analysis area among the video analysis information (ST910). As an example, the still image may be generated by cropping a specific area of video data determined to include an identifiable object among video data of the surveillance area detected for a specific area and a specific period and may be implemented as a JPEG image file.

An object to be captured in the still image may correspond to an object type included in the previously set video analysis function of the camera 100. More specifically, the still image may be a still image generated by cropping a specific area among the video analysis information corresponding to the surveillance area created in the metadata, i.e., a video portion corresponding to the object detected in the surveillance area. That is, the still image may be selected as a "best shot" still image most suitable for recognizing a specific object among the video data captured in the surveillance area.

In an embodiment of the disclosure, the above-described metadata and a corresponding still image are transmitted to the client, that is, the video receiving/searching device 300, in addition to the video data and audio data for the surveillance area captured by the camera 100 (ST920).

As an example, when the client additionally transmits "Require: Best Shot" in the operation of sending an RTSP DESCRIBE instruction to a server, an RTSP server that provides a function of generating and providing the above-described still image (e.g., a best shot) may transmit the metadata and the corresponding still image to the client in addition to the video data/audio data.

Subsequently, the video receiving/searching device 300 may provide an application for searching for the multi-channel video information received from the cameras 200 as the client, and thus an administrator may search for the transmitted multi-channel video information using the video receiving/searching device 300.

First, the video receiving/searching device 300 may receive the transmitted metadata, and the metadata together with the video and audio signals detected in the surveillance area may be transmitted to the video receiving/searching device 300 through the network 200 in real time and may be used for real-time control and video search to increase control convenience and search efficiency (ST930).

Likewise, the video receiving/searching device 300 may receive the transmitted still image, and the still image may be a still image generated by cropping a specific area among the video analysis information corresponding to the surveillance area created in the metadata, i.e., a video portion corresponding to the identifiable object detected in the surveillance area. That is, the still image may be selected as a "best shot" still image most suitable for recognizing a specific object among the video data captured in the surveillance area.

Also, by generating the still image as a thumbnail image and displaying the thumbnail image when searching for video data corresponding to the surveillance transmitted by the camera 200, the video receiving/searching device 300 may utilize the corresponding image to play back the transmitted video data of the surveillance area. More specifically, the video receiving/searching device 300 may display a "best shot" still image corresponding to the metadata information as a thumbnail image in addition to displaying the video analysis information transmitted in the form of the metadata with respect to the surveillance area.

Thus, the video receiving/searching device 300 may efficiently use the resources of the client by utilizing the still image as the thumbnail image without performing a separate video decoding procedure, and as a result, it is possible to more quickly and accurately search for video data of a surveillance area (ST940).

An example of utilizing the metadata and the best shot still image for a video search has been described in detail above with reference to FIG. 6, and thus a detailed description thereof will be omitted.

Subsequently, video information associated with predetermined "best shot" still images selected during the video search may be backed up, and the backed-up video information may be generated as video backup information and transmitted to the video backup device 400 (ST950). The video backup device 400 may perform an operation of storing and playing back the generated event-oriented channel-wise video backup information in response to the video search result of the video receiving/searching device 300 (ST 960). In this case, the video backup information may include a video backup file generated for each channel and a video playback software player.

That is, the backup of the channel-wise video information by the video receiving/searching device 300 may include the backup of metadata and/or still images included in the surveillance-area-wise video information, and thus the backup information that is played back in the video backup device 400 enables channel-wise video playback in an event-oriented manner. Accordingly, the metadata included in the video information is extracted when the channel-wise video information is backed up, and is contained in the video backup file generated for each channel.

An example configuration of the video backup file has been described in detail with reference to FIG. 7, and the video backup file may be played back by the image playback software player included in the video backup information in various modes according to a user's selection, examples of which has been described in detail through the embodiments of FIGS. 8A to 8D.

According to an embodiment of the disclosure, video information to be backed up is not simply backed up around a specific period, but by specifying an object related to an event and securing video information of a plurality of cameras that have captured the object, and therefore, it is possible to reproduce corresponding video information along the route of the object.

That is, by performing an intelligent video search through the network surveillance camera system according to an embodiment of the disclosure and by backing up and playing back the search result in an event-oriented manner, it is possible to provide convenience to a user and increase search efficiency and accuracy.

According to the embodiments of the disclosure, by providing a still image of an identifiable specific area among video analysis information for a surveillance area, it is possible for a client such as a video receiving/searching device to more quickly and accurately search for video data of the surveillance area using image information without performing a separate video decoding procedure.

Also, when searching for multi-channel video information transmitted from a plurality of network cameras or multi-channel video information for the network cameras generated through the video receiving/searching device, it is possible to specify a predetermined object and search for the video information. Thus, by backing up and playing back the search result in an event-oriented manner, it is possible to provide convenience to a user.

While having been described herein, example embodiments and application examples have been provided to merely help more general understanding of the disclosure, and the disclosure is not limited to the example embodiments. A person having ordinary knowledge in the art to which the disclosure pertains may change or modify the disclosure in various ways based on the foregoing description.

Accordingly, the spirit of the disclosure should not be determined based on only the described embodiments, and all changes equivalents to the claims and equivalent modifications thereof may be construed as belonging to the category of the spirit of the disclosure.

What is claimed is:

1. A network surveillance camera system comprising:
   a video receiving and/or searching device connected to a plurality of cameras through a network, and configured to receive video information and metadata in real time from the plurality of cameras through multiple channels and perform a video search on the video information; and
   a video backup device configured to store event-oriented and channel-wise video backup information generated according to a result of the video search of the video receiving and/or searching device, and play back the event-oriented and channel-wise video backup information,
   wherein the video information is obtained by the plurality of cameras configured to capture a plurality of surveillance areas, respectively,
   wherein the event-oriented and channel-wise video backup information comprises a video backup file generated for each channel and a video playback software player,
   wherein still images containing detected objects are obtained by cropping videos from the plurality of cameras,
   wherein the received video information includes both the videos and the still images cropped from the videos and the received metadata includes time information when the objects are detected, and a chronological order or the same time at which at least two still images are played is determined based on the time information, and
   wherein, when a user selects at least two still images from the still images and the chronological order is determined based on the time information, the selected at least two still images are listed in the chronological order in a section of a screen and the videos corresponding to the selected at least two still images are played in the chronological order in another section of the screen.

2. The network surveillance camera system of claim 1, wherein the video receiving and/or searching device is configured to receive a still image from each camera of the plurality of cameras,
   wherein the metadata is generated by each camera based on video analysis information corresponding to the a surveillance area, of the plurality of surveillance areas, and
   wherein the still image is generated by each camera by cropping a video portion corresponding to an object detected within the surveillance area among the video analysis information.

3. The network surveillance camera system of claim 2, wherein the metadata comprises detection information, identification information, location information, and time information of the object captured in the surveillance area.

4. The network surveillance camera system of claim 2, wherein the still image is an image selected, among video data captured in the surveillance area, as an image suitable for recognizing a specific object.

5. The network surveillance camera system of claim 4, wherein the still image comprises a Joint Photographic Experts Group (JPEG) image file.

6. The network surveillance camera system of claim 2, wherein the video receiving and/or searching device comprises a search viewer application program configured to generate a thumbnail image using channel-wise still images transmitted from the plurality of cameras and perform the video search on the video information received through the multiple channels.

7. The network surveillance camera system of claim 6, wherein the search viewer application program is configured to display object identification information of channel-wise metadata transmitted from the plurality of cameras, and display thumbnail images corresponding to the object identification information.

8. The network surveillance camera system of claim 7, wherein video information associated with a predetermined thumbnail image selected from among the thumbnail images is generated as the event-oriented and channel-wise video backup information, and the generated video backup information is provided to the video backup device.

9. The network surveillance camera system of claim 1, wherein the video backup file generated for each channel comprises one or more of a timeline database, a key frame index database, a video frame header and video data, an audio frame header and audio data, a metadata header and metadata, and a still image header and a still image file.

10. The network surveillance camera system of claim 1, wherein the video playback software player is operated in a mode, among a plurality of modes, according to a user's selection, the plurality of modes comprising a sequential playback mode, a simultaneous playback mode, a same-period playback mode, and an individual-time playback mode.

11. An event-oriented multi-channel video backup method, comprising:
capturing, by using a plurality of cameras, a plurality of surveillance areas to acquire video information for the plurality of surveillance areas;
transmitting the video information for each of the plurality of surveillance areas through a corresponding one of multiple channels;
receiving the video information from the plurality of cameras and performing a video search on the video information received through the multiple channels;
backing up channel-wise video information generated according to a result of the video search; and
storing and playing back the backed-up information,
wherein the backing up the channel-wise video information comprises backing up metadata included in the video information for each of the plurality of surveillance areas, and the playing back the backed-up information is performed in an event-oriented and channel-wise manner based on the backed-up metadata,
the method further comprising:
obtaining still images containing detected objects by cropping videos from the plurality of cameras,
wherein the received video information includes both the videos and the still images cropped from the videos and the received metadata includes time information when the objects are detected, and a chronological order or the same time at which at least two still images are played is determined based on the time information,
the method further comprising:
when a user selects at least two still images from the still images and the chronological order is determined based on the time information, listing the selected at least two still images in the chronological order in a section of a screen and playing the videos corresponding to the selected at least two still images in the chronological order in another section of the screen.

12. The event-oriented multi-channel video backup method of claim 11, wherein the video information comprises video analysis information for the video information for each surveillance area generated as metadata and a still image obtained by cropping a video portion corresponding to an object detected within a surveillance area.

13. The event-oriented multi-channel video backup method of claim 12, wherein the performing the video search comprises:
generating a thumbnail image using channel-wise still images transmitted from the plurality of cameras;
displaying object identification information of channel-wise metadata transmitted from the plurality of cameras in a form of text and displaying thumbnail images corresponding to the object identification information; and
generating video information associated with predetermined thumbnail images selected from among the thumbnail images as video backup information.

14. The event-oriented multi-channel video backup method of claim 13, wherein the video backup information comprises a video backup file generated for each channel and a video playback software player, and
wherein the metadata included in the video information is extracted based on the channel-wise video information being backed up, and is contained in the video backup file for each channel.

15. The event-oriented multi-channel video backup method of claim 14, wherein the video backup file generated for each channel comprises one or more of a timeline database, a key frame index database, a video frame header and video data, an audio frame header and audio data, a metadata header and metadata, and a still image header and a still image file.

16. The event-oriented multi-channel video backup method of claim 14, wherein the video playback software player is operated in a mode, among a plurality of modes, according to a user's selection, the plurality of modes comprising a sequential playback mode, a simultaneous playback mode, a same-period playback mode, and an individual-time playback mode.

17. A video backup device comprising:
an event-oriented channel-wise video backup file, generated according to a search result performed on channel-wise video information received from a surveillance camera; and
a video playback software player configured to play back an event-based video selected by combining one or more pieces of information included in the event-oriented channel-wise video backup file,
wherein the one or more pieces of information comprise a still image and metadata corresponding to the channel-wise video information,
wherein still images containing detected objects are obtained by cropping videos from the surveillance camera,
wherein the received video information includes both the videos and the still images cropped from the videos and the metadata includes time information when the objects are detected, and a chronological order or the same time at which at least two still images are played is determined based on the time information, and
wherein, when a user selects at least two still images from the still images and the chronological order is determined based on the time information, the selected at least two still images are listed in the chronological order in a section of a screen and the videos corresponding to the selected at least two still images are played in the chronological order in another section of the screen.

18. The video backup device of claim 17, wherein the metadata comprises one or more of detection information, identification information, location information, and time information of an object captured by the surveillance camera, and the still image is selected as a still image suitable for a specific object in video data captured by the surveillance camera.

19. The video backup device of claim 17, wherein the event-oriented channel-wise video backup file comprises:
basic information including one or more format version information, creator information, basic information of an original camera list, and start offset position information of recorded data in a file; and
detailed information including one or more of a timeline database, a key frame index database, a video frame header and video data, an audio frame header and audio data, a metadata header and metadata, and a still image header and a still image file.

20. The video backup device of claim 17, wherein the video playback software player is operated in a mode, among a plurality of modes, according to a user's selection, the plurality of modes comprising a sequential playback mode, a simultaneous playback mode, a same-period playback mode, and an individual-time playback mode.

* * * * *